Aug. 7, 1928.
W. E. DOERR ET AL
1,679,564
GAS CONTAINER FOR AIRSHIPS
Filed April 23, 1924
Fig. 1
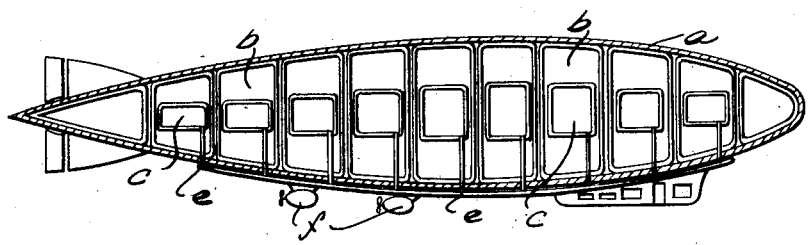
Fig. 2     Fig. 3     Fig. 4
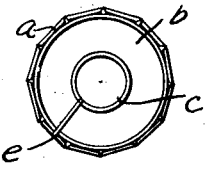 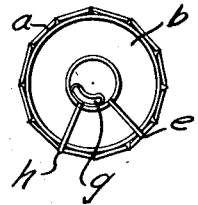 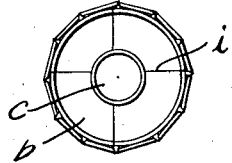
Wilhelm E. Doerr
Ernst A. Lehmann
           INVENTORS
BY
Cruse Hhmann
           ATTORNEYS Patented Aug. 7, 1928.

1,679,564

UNITED STATES PATENT OFFICE.

WILHELM E. DOERR, OF NEW YORK, N. Y., AND ERNST A. LEHMANN, OF AKRON, OHIO, ASSIGNORS TO LUFTSCHIFFBAU ZEPPELIN GESELLSCHAFT MIT BESCHRÄNKTER HAFTUNG, OF FRIEDRICHSHAFEN, BODENSEE, GERMANY.

GAS CONTAINER FOR AIRSHIPS.

Application filed April 23, 1924, Serial No. 708,327, and in Germany May 16, 1923.

Our invention relates to airships in which the buoyancy is produced by lifting gas, and it has for its object the use of two different gases to produce the buoyancy, which gases are of different specific weight. Preferably one of the gases will be heavier than the other. The gases which we prefer are hydrogen and helium, the hydrogen being substantially half the weight of helium. Preferably the gases are kept in separate gas containers or cells arranged one within the other. If the cell of the lighter gas is within the cell of the heavier one, the cell with the lighter gas may float in the heavier gas. We will describe an airship embodying our invention and then point out the novel features in claims.

In the accompanying drawing, Fig. 1 is a longitudinal section of a rigid airship fitted with gas cells or containers and embodying our invention. Figs. 2 to 4 are each cross-sectional views showing modifications, but each of them embodying our invention.

Referring to the drawing, the hull of the airship is designated by $a$ and may be any of the constructions well known in the art. $b$ designates an outer cell and $c$ designates the cells provided within the cells $b$. The pairs of cells are arranged within the usual compartments provided within the hull $a$. In the drawings we have shown eleven cells $b$ and nine cells $c$. The cells $c$ are omitted from the end cells $b$ because of their limited capacity.

If helium and hydrogen gases are used, the outer cells $b$ are inflated with helium, the heavier gas, while the inner cells $c$ are inflated with the hydrogen gas. When the size of the inner cell or container $c$ and its weight are properly chosen, the conditions of Fig. 2 will be met, that is to say, gas cell $c$ will float in equilibrium within gas cell $b$. It will, however, be advantageous to provide means for holding the cell $c$ in a certain position, as conditions of inflation and buoyancy will change with changes in the air surrounding the airship. Such means may be stays in the form of ropes, tapes, wires or the like $i$ (see Fig. 4) connected with the walls of the inner cell and preferably extending through the wall of the cell $b$ through gas-tight openings. The free ends of the stays may be fixed to adjacent parts of the hull.

This arrangement may be useful in case of leakage of the outer cell. In this event the stays $i$ may then be loosened and the inner cell moved to close—or nearly close—the rupture in the wall of the outer cell by the wall of the inner cell.

If on a flight the gas cells have lost some of their contents, the lower part of their walls tend, by their weight, to create an under-pressure within the cell. This disadvantage may, in accordance with our invention, be decreased by the buoyancy of the inner cell carrying by means of the stays $i$ the weight of the lower part of the wall of the outer cell. Suitable valves are provided for the outer cell and they may be arranged in the usual way. The inner cell $c$ is provided with a suitable valved conduit $e$ for the escape of the hydrogen to the atmosphere or to some furnace or even to one of the motors of the airship to be burnt. In case the escaping hydrogen is to be burnt, precaution will have to be taken to avoid ignition moving backwards from the motor through the conduit to the gas cell $c$. The valves should be weighted in such a way that those of the cell $c$ open at a comparatively lower pressure than those of the cell $b$. This gives the advantage of losing first the inexpensive and less valuable hydrogen gas. And with adequate dimensions of the two cells for the relative purposes of the ship it may in general be possible to avoid totally the escape of helium through the valves.

The arrangement of inner and outer gas cells according to our invention has the further advantage of enclosing the inflammable hydrogen gas on all sides with the non-inflammable helium, so that about the same conditions regarding safety of the airship are obtainable as if the ship had been inflated with helium only, while the unavoidable loss of gas with longer flights is limited to the cheaper gas.

Within the cell $c$ a bag $g$ (see Fig. 3) may be arranged for the purpose of being inflated with air through a conduit $h$, and thereby controlling the shape of the cells. Such a ballonet $g$ may as well be placed within the outer cell $b$, or even adjacent to it, giving the same effect. Besides it may serve for forcing lifting gas out of the cells—especially the inner cell—for the purpose of making the ship heavier if necessary, for example, after a long flight.

We want it understood that we do not limit ourselves to the examples described or shown in the drawings—these pertaining especially to airships of the rigid type, as many variations will be apparent to those familiar with the art.

What we claim is:

1. An airship comprising an outer container inflated with one kind of lifting gas; an inner container inflated with another kind of lifting gas; and means for laterally moving said inner container within said outer container and for bringing into contact the wall of said inner container with the wall of said outer container.

2. An airship comprising an outer container inflated with one kind of lifting gas; a smaller inner container inflated with another kind of lifting gas; said inner container on all sides being surrounded by said outer container; and an air bag contiguous to said smaller container.

3. An airship comprising an outer container inflated with one kind of lifting gas; a smaller inner container inflated with a second kind of lifting gas; and an airbag within said smaller container.

WILHELM E. DOERR.
ERNST A. LEHMANN.